United States Patent
Snow

(10) Patent No.: US 6,597,769 B2
(45) Date of Patent: Jul. 22, 2003

(54) TELEPHONE ORDERING SYSTEM AND METHOD

(76) Inventor: Shawn Snow, 19080 NE. 3rd Ct. #304, North Miami Beach, FL (US) 33179

(*) Notice: Subject to any disclaimer, the term of this patent is extended or adjusted under 35 U.S.C. 154(b) by 0 days.

(21) Appl. No.: 09/919,199

(22) Filed: Jul. 31, 2001

(65) Prior Publication Data

US 2003/0026395 A1 Feb. 6, 2003

(51) Int. Cl.$^7$ ............................................. H04M 11/00
(52) U.S. Cl. ............................... 379/93.12; 379/93.17; 379/910
(58) Field of Search ........................... 379/93.12, 93.17, 379/910; 705/26, 15, 16, 17

(56) References Cited

U.S. PATENT DOCUMENTS 4,654,482 A * 3/1987 DeAngelis ............... 379/93.12

FOREIGN PATENT DOCUMENTS

JP 408055161 A * 2/1996 ............ G06F/17/60

* cited by examiner

Primary Examiner—Melur Ramakrishnaiah

(57) ABSTRACT

A system and method (10) that enables customers (15) to order products and services from business vendors (19) using customized selection codes (24A) that they enter into a telephone ordering system (17). The order (32) is then transmitted (33) to the business vendor (19). The vendor (19) receives the order (32) and processes the order.

1 Claim, 6 Drawing Sheets

Set Custom Codes 04
05
06
07
↓
99

Go!

| 01 | Selection: 6-inch Sub- $1.50 |

Bread: White
Ingredients: Lettuce, Tomatoes, Onions, Pickles, Salt and Pepper

[Edit] [Delete] [Place Order]

| 02 | Selection: 6-inch Sub w/ soft drink- $2.25 |

Bread: Wheat
Ingredients: Lettuce, Tomatoes, Onions, Green Peppers, Oil and Vinegar
Soft Drink: Pepsi

[Edit] [Delete] [Place Order]

| 03 | Selection: Footlong Sub w/ soft drink- $3.75 |

Bread: Wheat
Ingredients: Lettuce, Tomatoes, Onions, Green Peppers, Oil and Vinegar
Soft Drink: Pepsi

[Edit] [Delete] [Place Order]

→ Selection: Vegetable Sub

○ Six Inch -- $1.69    ○ Footlong -- $2.79
○ Six Inch Combo -- $2.69    ○ Footlong Combo -- $3.79

Bread

○ White    ○ Wheat

Ingredients

☐ Lettuce         ☐ Tomatoes
☐ Pickles         ☐ Onions
☐ Green Peppers   ☐ Salt and Pepper
☐ Oil and Vinegar ☐ Combo (Check box if only selecting combo)

Soft Drinks

☐ Cola
☐ Root Beer

Chips

☐ Potato Chips
☐ BBQ
☐ Sour Cream (Additional Comments - Special Requests)

[text area]

[Submit Form] [Reset Form]

FIG. 3C

TELEPHONE ORDERING SYSTEM AND METHOD

BACKGROUND

Field of the Invention

This invention relates to ordering methods.

SUMMARY OF THE INVENTION

A system and method that enables customers to order products and services from business vendors using customized selection codes that they enter into a telephone ordering system. The order is then transmitted to the business vendor. The vendor receives the order and processes the order.

In an embodiment of the present invention, the telephone ordering system enables customers to order products & services from various participating business vendors. The telephone ordering system is a telephone procedure that dynamically generates orders in response to a customer's request using a combination of set and customized codes that are entered into the customers telephone keypad.

Once a telephone customer places an order, the telephone ordering system automatically transmits the order to the business vendor at the correct location though the use of any type of communication line, such as but not limited to facsimile transmission, stationary phones, cell phones, mobile phones, e-mail, web communication, mobile web-based systems, and the like.

The present invention offers customers the opportunity of using customized selection codes to order products & services from business vendors. The customer can give customized selection codes to product & services offered by a business by using software in which they set these customized selection codes. These codes would then interact with the telephone ordering system when a customer is placing an order. For example let's use the example of a participating restaurant that serves sub sandwiches. To customize an order the customer would first have to access their account. They access their account through a computer that is connected to the Internet. The customer would than enter the appropriate web address or universal resource locator (URL) to access the software. Once at the correct website, the customer would enter their account number and password in the appropriate boxes to access their account. From there they could customize any of their selection codes to fit their needs for any business vendor. They can also have as many different variations of any product or service that they would like. This allows for the ultimate in personal customization.

The telephone ordering system codes which can be set by the customer includes one of the following methods or a combination of.

Customer uses custom codes for customized selections.
Customer uses custom codes for set selections.
Customer uses set codes for customized selections.

ADVANTAGES

There are many advantages of the telephone ordering system and method. Some of the advantages are listed below:

(a) to save time ordering your favorite products and services from business vendors;
(b) to save time by not having to wait in line for products and services;
(c) allows customers to give a business vendor's products and services a customized selection code. This would allow a customer to order repeated products and services quickly;
(d) allows customers to go to any nationwide business vendor and get personalized service;

BRIEF DESCRIPTION OF THE DRAWINGS

Additional objects and features of the invention will be more readily apparent from the following detailed descriptions and appended claims when taken in conjunction with the drawings, in which:

FIGS. 3A–3C are schematic representations of exemplary pages of the software program of the preferred embodiment of the invention.

DESCRIPTION OF THE PREFERRED EMBODIMENTS

Figure 1:
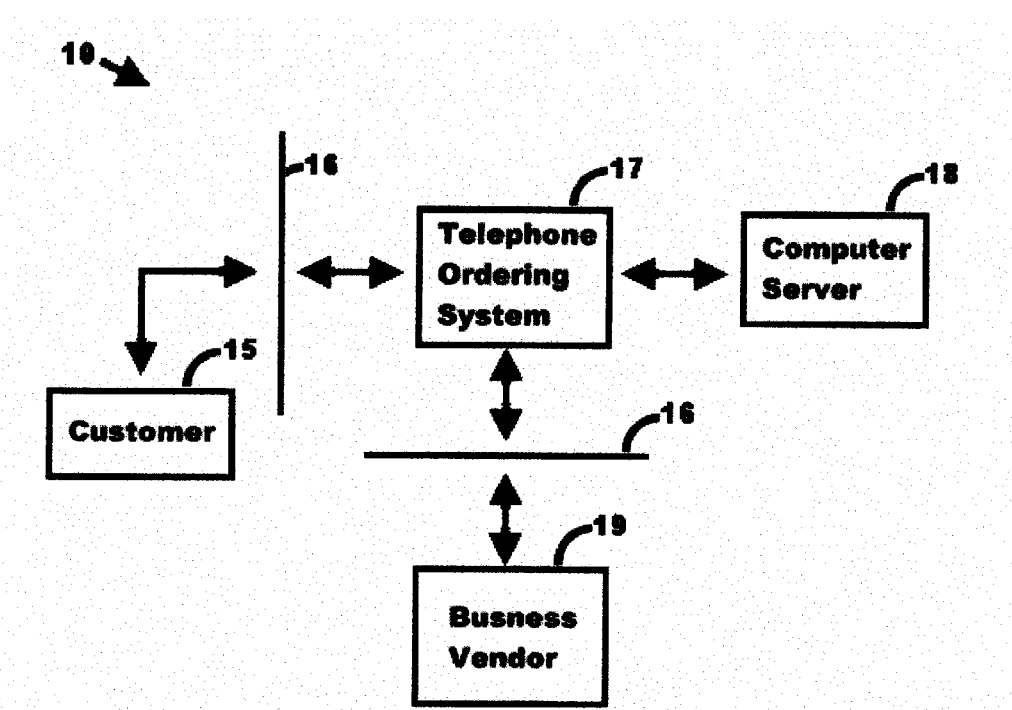
FIG. 1 is a block diagram of an embodiment of a system and method incorporating the present invention.

FIG. 1 illustrates a system and method 10 representing an embodiment of the present invention. The communication line 16 refers to any type of stationary or mobile phone line. A customer 15 can use any type of device that uses communication lines 16 to access the telephone ordering system 17, such as but not limited to stationary phones, cell phones, mobile phones facsimile transmission, payphones, e-mail, web communication, mobile web-based systems, and the like. The server computer 18 is in communication with the telephone ordering system 17 allowing various functions to be performed like accessing information, sending information back and forth and the like. The telephone ordering system 17 sends information to the various business vendors 19 and the correct business vendor 19 location though the use of any type of communication line 16.

The system and method described above are presented for purposes of illustration and description. They are not intended to be exhaustive or to limit the invention to the precise forms disclosed, obviously many modifications and variations are possible in view of the above teachings.

Figure 2:
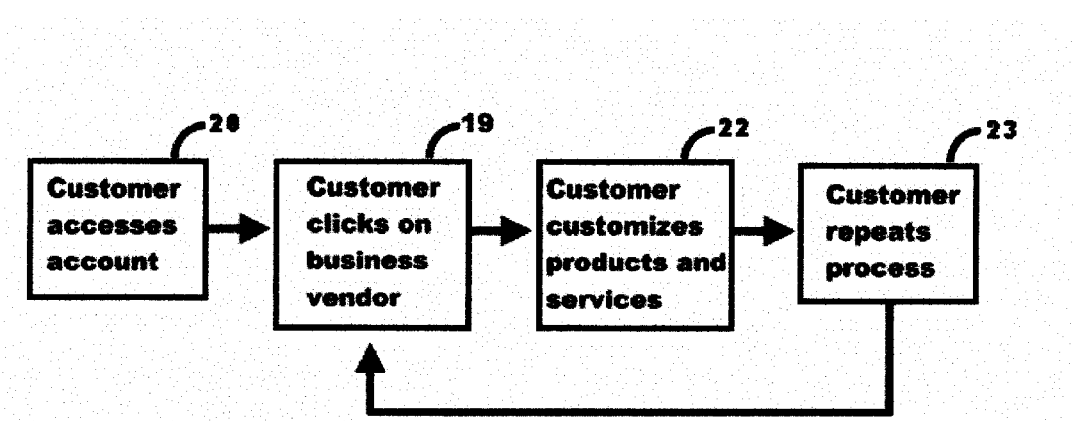
FIG. 2 is a block diagram of the process a customer would take to customize their selection codes.

FIG. 2 illustrates the process a customer 15 would take to customize their selection codes 24A. The customer 15 would first have to access their account 20. They access their account 20 through a computer that is connected to the Internet. The customer 15 would than enter the appropriate web address or universal resource locator (URL) to access the software. Once at the correct website, the customer 15 would enter their account number and password in the appropriate boxes to access their account 20.

The customer 15 would then select the business vendor 19 that they wanted to make changes to or customize products or services 22. From there the customer 15 could customize any of their products or services 22 to fit their needs for any business vendor 19. The customer would repeat the process 23 as many times as they would like.

The telephone ordering system codes which can be set by the customer includes one of the following methods or a combination of:

Customer uses custom codes for customized selections.
Customer uses custom codes for set selections.
Customer uses set codes for customized selections.

The steps described above are presented for purposes of illustration and description. They are not intended to be exhaustive or to limit the invention to the precise forms disclosed, obviously many modifications and variations are possible in view of the above teachings.

Figure 3A:
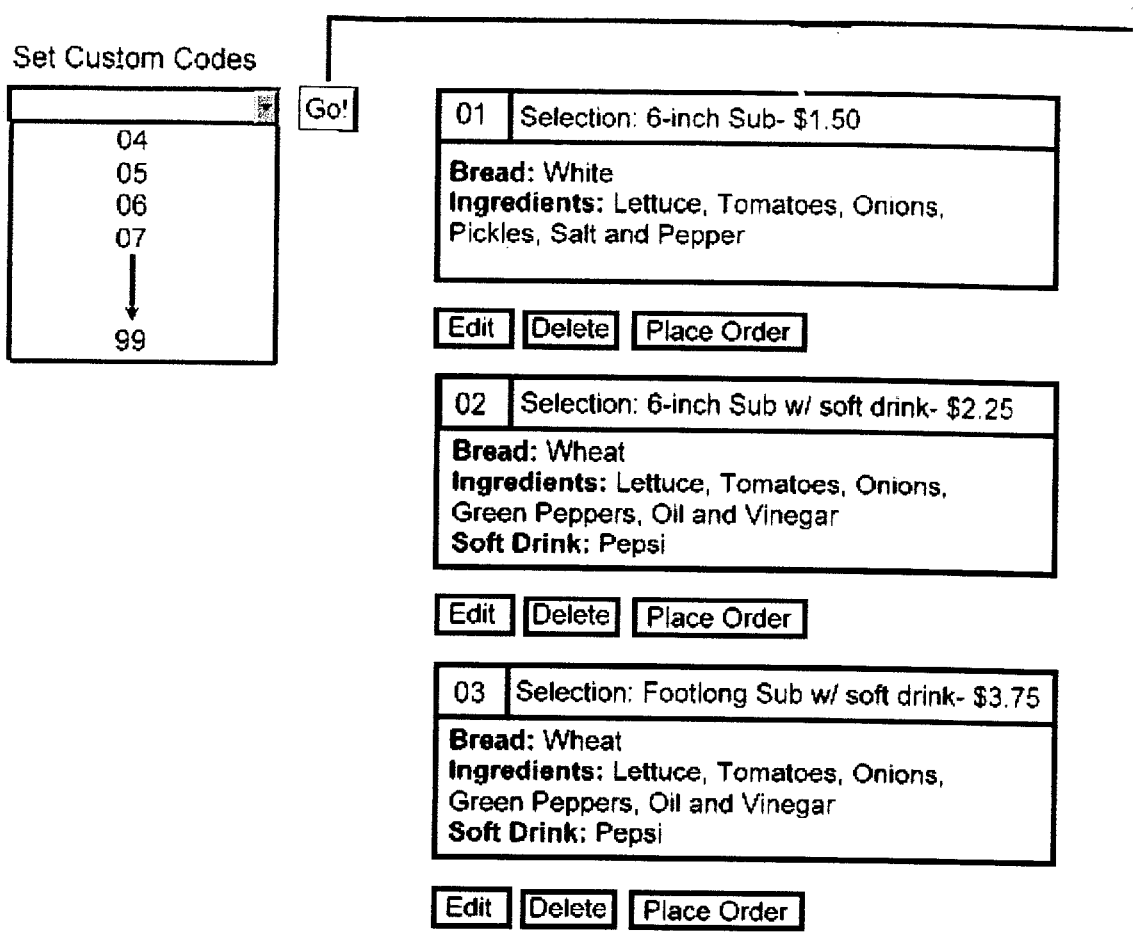
Figure 3B:
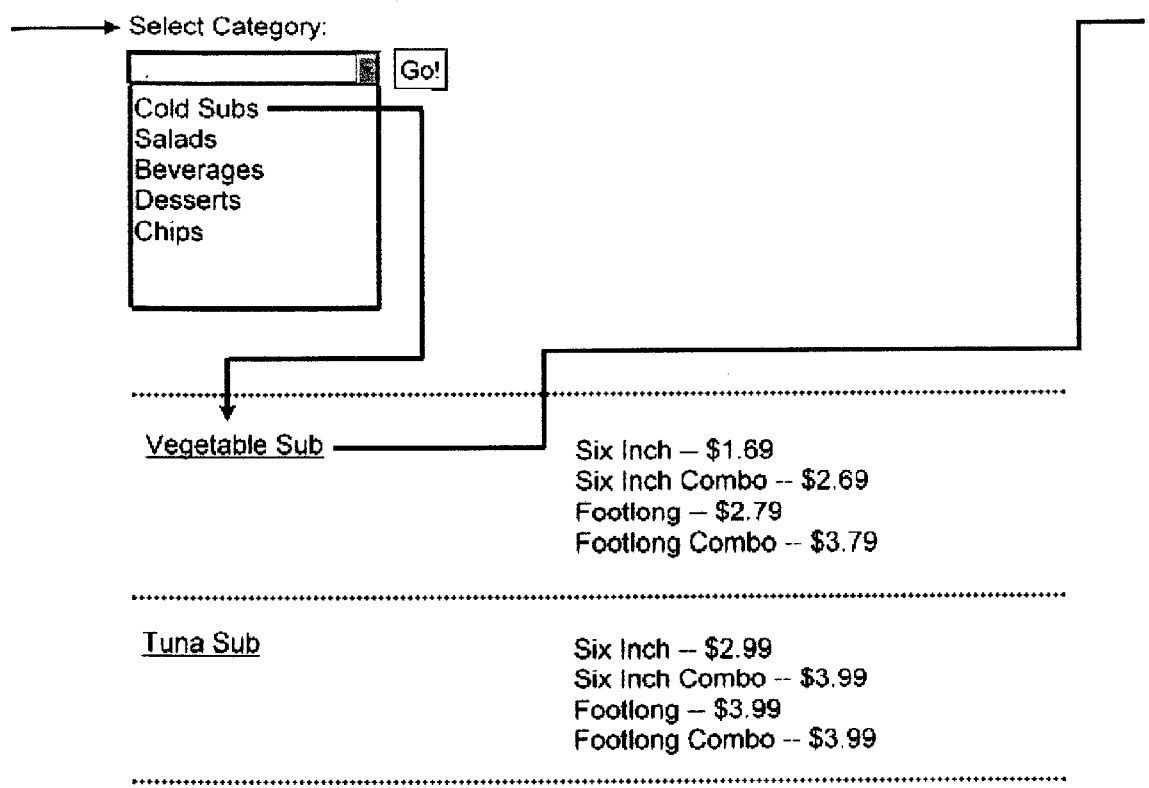

FIGS. 3A–3C are schematic representations of exemplary pages of the software program of the preferred embodiment of the invention. FIG. 3A shows the first step a customer 15 would take in customizing a product or service 22 for a particular business vendor 19. The customer would select a customized selection code 24 from the drop down menu and press go.

FIG. 3B shows the second step a customer 15 would take in customizing a product or service 22 for a particular business vendor 19. The customer 15 would next select a category 26 from the drop down menu and press go. All of that particular business vendor's 19 products and services for that category 26 would appear on the screen. The customer 15 would select the product or service that they wanted to customize 22 by clicking on the link of that item 27.

FIG. 3C shows the third step a customer 15 would take in customizing a product or service 22 for a particular business vendor 19. The customer 15 would next customize that item 27 by clicking on the radio buttons 28 and check boxes 29 of their choice. Upon completion of customizing that item 27 the customer 15 would submit item 27 by clicking on the appropriate button.

FIG. 3A shows a customized selection code 24A. The customer 15 can edit or delete this selection code 24A at any time by clicking on the appropriate button.

The software program and the steps described above are presented for purposes of illustration and description. They are not intended to be exhaustive or to limit the invention to the precise forms disclosed, obviously many modifications and variations are possible in view of the above teachings.

Figure 4:
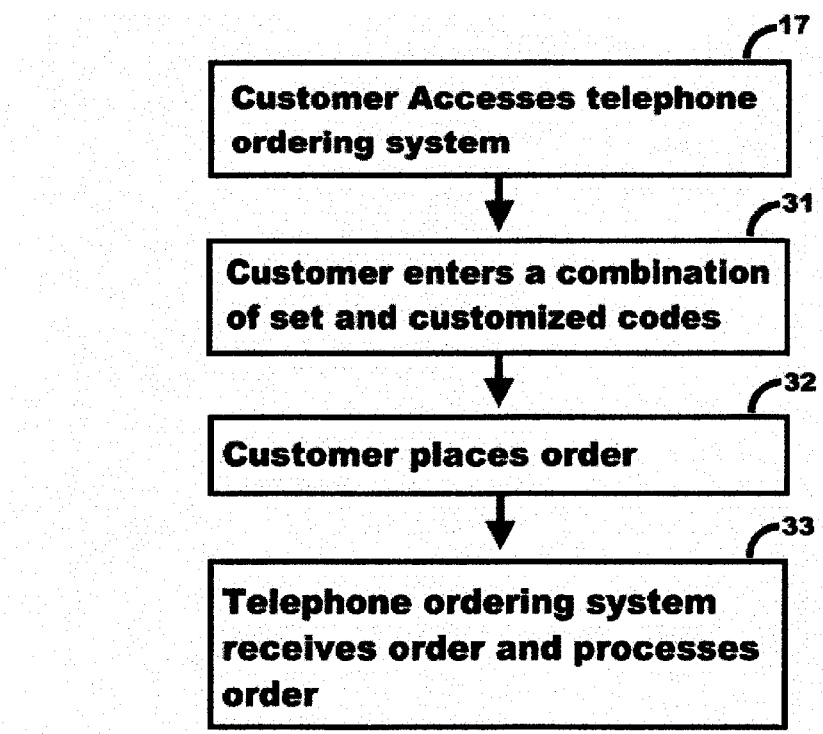
FIG. 4 is a flow chart illustrating the steps used to process an order in a preferred embodiment of the present invention.

FIG. 4 is a flow chart illustrating the steps used to process an order in a preferred embodiment of the present invention.

The customer 15 accesses the telephone ordering system 17 through a communication line 16. A customer 15 can use any type of device that uses communication lines 16 to access the telephone ordering system 17, such as but not limited to stationary phones, cell phones, mobile phones, facsimile transmission, payphones, e-mail, web communication, mobile web-based systems, and the like. The customer 15 enters the appropriate phone number to access the telephone ordering system 17. When a customer 15 access the telephone ordering system 17, the customer 15 hears a recorded message including voice prompts for responses from the customer 15. An exemplary transcript of such a recorded message can be as follows:

Welcome to EXLINE, your express line for services. To order products and services from business vendors press 1. To speak to an EXLINE customer service representative press 2.

When the customer 15 presses 1, the voice continues with the following segments which are played following the correct keypad entries. (If there is an incorrect keypad entry, a voice will indicate to the customer 15 to try again.)

Please enter last four digits of your account. Please enter your four-digit password. Please enter three-digit business vendor code. Please enter business vendor location code.

After customer 15 has entered correct information, the voice will welcome the customer 15 to the correct business vendor 19. Below is an exemplary transcript of such a recorded message.

Welcome to (business vendor intro.) located on 123 Main St. Anywhere, USA.

Next depending on business vendor 19 and type of product or service offered, voice recorded messages will ask for the selection codes. These will be a combination of set and customized codes 31 that are entered into the customers telephone keypad. After order 32 is submitted, the voice will repeat the order 32, so customer 15 has the chance to confirm order 32 before placing the order 32. Below is an exemplary transcript of such a recorded message.

You have ordered (description of product or service) from (business vendor and location). If this is correct, please press pound.

If order 32 is correct, the customer 15 will press pound to submit the order 32. If order 32 is incorrect customer 15 will press * twice to start over again.

After order 32 is placed the order 32 is automatically transmitted 33 to the business vendor 19 at the correct location though the use of any type of communication line 16, such as but not limited to facsimile transmission, stationary phones, cell phones, mobile phones, e-mail, web communication, mobile web-based systems, and the like.

The present invention is not constrained to any one method of allowing customers to enter set and customized codes into the telephone ordering system. Various methods apply such as telephone keypad entry, speech recognition and the like. Customer can use either of the methods described above or a combination of.

The steps used to process an order and the recorded messages including voice prompts described above are presented for purposes of illustration and description. They are not intended to be exhaustive or to limit the invention to the precise forms disclosed, obviously many modifications and variations are possible in view of the above teachings.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents, than by the examples given.

Although the present invention has been described with reference to ordering products and services from business vendors, it is not limited to any particular product, service or vendor. The present invention can be used for other commerce purposes, other commodities, other types of vendors, and other types of products and services.

In addition, the present invention is not constrained to any one method of allowing a customer to access the telephone ordering system or the online software. Other types of connections can be established which will enable the customer to communicate with the telephone ordering system, or the online software, through the use of phone lines thereby allowing stationary phone communication, cell phone communication, mobile phone communication, facsimile transmission, payphone communication, e-mail communication, web communication, mobile web-based communication, and the like.

Also the present invention is not constrained to any one method of transmitting a customer's order to the business vendor. The above described communication connections also apply to transmitting a customer's order to the business vendor.

Furthermore the present invention is not constrained to any one method of allowing customers to enter set and customized codes into the telephone ordering system. Various methods apply such as telephone keypad entry, speech recognition and the like. Customer can use either of the methods described above or a combination of.

The telephone ordering system codes which can be set by the customer includes one of the following methods or a combination of.

Customer uses custom codes for customized selections.
Customer uses custom codes for set selections.
Customer uses set codes for customized selections.

What is claimed:

1. A system and method comprising of:
   a telephone ordering system that allows customers to order products and services from business vendors;
   an ordering method that allows said customers to preprogram their selected orders from said vendors for future and repeated use;
   an online account assigned to said customers that allows them to customize orders for said vendors and assign a number and/or keyword to that selection from a drop down box;
   said customers go online to their said account, select said vendor from the use of website links, select item(s) and customize that selection wing check boxes and radio buttons;
   said customer next saves orders for future use;
   an order taking process using keypad and speech entry;
   the said system guides said customers through the process requesting said order taking information such as vendor name, location and said customer's selections;
   if said customer enters invalid entry, the said system will prompt the said customer for correct code;
   before orders are placed they sit repeated to said customer for confirmation;
   an order sending process using fax, instant messaging, traditional e-mail or computer transmission;
   said vendors would specify transmission method comprising
   software modules consisting of Internet, phone, said order taking, said order sending and adding and maintaining said vendors;
   databases stored on computer servers consisting of said system menu prompts and valid entries, speech recognition library, said customer accounts, said vendor information such as operation hours, store locations, product and services list prices and said order transmission information;
   connected components of the said system consisting of said software modules, said databases stored on said computer servers and telephone communication lines.

* * * * *